US009619066B2

(12) United States Patent
Gwon et al.

(10) Patent No.: US 9,619,066 B2
(45) Date of Patent: Apr. 11, 2017

(54) TOUCH SENSOR INTEGRATED TYPE DISPLAY DEVICE

(71) Applicant: LG Display Co., Ltd., Seoul (KR)

(72) Inventors: Hyangmyoung Gwon, Gyeonggi-do (KR); Jihyun Jung, Gyeonggi-do (KR); Jaegyun Lee, Gyeonggi-do (KR); Ruda Rhe, Gyeonggi-do (KR); Yangsik Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 77 days.

(21) Appl. No.: 14/568,435

(22) Filed: Dec. 12, 2014

(65) Prior Publication Data

US 2016/0041665 A1 Feb. 11, 2016

(30) Foreign Application Priority Data

Aug. 11, 2014 (KR) .......................... 10-2014-0103983

(51) Int. Cl.
  *G06F 3/041* (2006.01)
  *G06F 3/044* (2006.01)
(52) U.S. Cl.
  CPC ............ *G06F 3/0412* (2013.01); *G06F 3/044* (2013.01)
(58) Field of Classification Search
  CPC ........ G06F 3/044; G06F 3/0412; G06F 3/041; G06F 3/045; G06F 3/0416; G06F 3/046; G09G 5/006; G09G 2300/0426; G02F 1/13458; G02F 1/136286
  See application file for complete search history.

(56) References Cited

U.S. PATENT DOCUMENTS 6,771,028 B1 * 8/2004 Winters .............. G09G 3/3233
315/169.1
2001/0007490 A1   7/2001 Ohta et al.
2006/0176285 A1 * 8/2006 Lee .................... G02F 1/13338
345/173
(Continued)

FOREIGN PATENT DOCUMENTS

JP    2001194675 A    7/2001
KR   10-2012-0097765 A   9/2012

OTHER PUBLICATIONS

Korean Office Action for corresponding Korean Patent Application No. 10-2014-0103983, dated Mar. 28, 2016.

(Continued)

*Primary Examiner* — MD Saiful A Siddiqui
(74) *Attorney, Agent, or Firm* — Morgan, Lewis & Bockius LLP

(57) ABSTRACT

A touch sensor integrated type display device includes a plurality of gate lines and a plurality of data lines which are arranged to cross over each other, a plurality of pixel electrodes respectively disposed in areas defined by the crossing of the plurality of gate lines and the plurality of data lines, a plurality of touch electrodes serving as common electrodes, each of which overlaps some of the plurality of pixel electrodes in an active area, and a routing wire which is arranged on at least one side of each of first and second data lines related to the some pixel electrodes corresponding to each touch electrode serving as the common electrode in parallel with the first and second data lines. The routing wire is connected to the touch electrode serving as the common electrode.

15 Claims, 11 Drawing Sheets

(56) References Cited

U.S. PATENT DOCUMENTS

| | | | |
|---|---|---|---|
| 2011/0310032 A1* | 12/2011 | Chen | G06F 3/0412 |
| | | | 345/173 |
| 2012/0127121 A1* | 5/2012 | Juan | G06F 3/0412 |
| | | | 345/174 |
| 2012/0218199 A1* | 8/2012 | Kim | G06F 3/0412 |
| | | | 345/173 |
| 2014/0118277 A1* | 5/2014 | Kim | G06F 3/044 |
| | | | 345/173 |
| 2014/0232955 A1* | 8/2014 | Roudbari | G06F 3/041 |
| | | | 349/12 |
| 2015/0234510 A1* | 8/2015 | Chang | G02F 1/13338 |
| | | | 345/173 |

OTHER PUBLICATIONS

Notice of Reason for Refusal dated Jul. 28, 2016 from the Japanese Patent Office in counterpart Japanese Application No. 2015-1586567.

\* cited by examiner

TOUCH SENSOR INTEGRATED TYPE DISPLAY DEVICE

This application claims the benefit of priority under 35 U.S.C. §119(a) to Korean Patent Application No. 10-2014-0103983 filed on Aug. 11, 2014, which is incorporated by reference herein in its entirety.

BACKGROUND OF THE INVENTION

Field of the Invention

The present disclosure relates to a touch sensor integrated type display device, and more particularly, to a touch sensor integrated type display device capable of improving image quality, uniformly distributing liquid crystals, and preventing a light leakage phenomenon.

Discussion of the Related Art

In recent years, flat panel displays (hereinafter abbreviated to "display devices"), which are able to be manufactured as a large-sized display device at a low price and have high display quality (including an implementation capability of a motion picture, a resolution, brightness, a contrast ratio, a color representation capability, etc.), are being developed in accordance with the need for the display devices capable of properly displaying the multimedia with the development of multimedia. Various input devices, such as a keyboard, a mouse, a track ball, a joystick, and a digitizer, have been used in the display devices to allow users to interface with the display devices.

However, when the user makes use of these input devices, user's dissatisfaction increases because the user is required to learn how to use the input devices and the input devices occupy space, thereby having difficulty in increasing the perfection of products. Thus, a demand for a convenient and simple input device for the display device capable of reducing erroneous operations is increasing. In response to the demand, a touch sensor was proposed to recognize information when the user inputs the information by directly touching the screen or approaching the screen with his or her hand or a pen while he or she watches the display device.

The touch sensor has a simple configuration capable of reducing the erroneous operations. The user can also perform an input action without using a separate input device and can quickly and easily manipulate a display device through the contents displayed on the screen. Thus, the touch sensor has been applied to various display devices.

The touch sensor used in the display device may be classified into an add-on type touch sensor, an on-cell type touch sensor, and an integrated type (or in-cell type) touch sensor depending on its structure. The add-on type touch sensor is configured such that the display device and a touch sensor module including the touch sensor are individually manufactured and then the touch sensor module is attached to an upper substrate of the display device. The on-cell type touch sensor is configured such that elements constituting the touch sensor are directly formed on the surface of an upper glass substrate of the display device. The integrated type touch sensor is configured such that elements constituting the touch sensor are mounted inside the display device to thereby achieve thin profile of the display device and increase the durability of the display device.

Among the above touch sensors, because the integrated type touch sensor may commonly use a common electrode of the display device as a touch electrode, a thickness of the display device may decreases as compared to the other touch sensors. Further, because the touch elements of the integrated type touch sensor are formed inside the display device, the durability of the display device may increase. Hence, the integrated type touch sensor has been widely used.

The integrated type touch sensor can solve the problems generated in the add-on type touch sensor and the on-cell type touch sensor because of the advantages of the thin profile and the durability improvement. The integrated type touch sensor may be divided into a light type touch sensor and a capacitive touch sensor depending on a method for sensing a touched portion. The capacitive touch sensor may be subdivided into a self capacitive touch sensor and a mutual capacitive touch sensor.

The self capacitive touch sensor forms a plurality of independent patterns in a touch area of a touch sensing panel and measures changes in a capacitance of each independent pattern, thereby deciding whether or not a touch operation is performed. The mutual capacitive touch sensor crosses X-axis electrode lines (for example, driving electrode lines) and Y-axis electrode lines (for example, sensing electrode lines) in a touch electrode formation area of a touch sensing panel to form a matrix, applies a driving pulse to the X-axis electrode lines, and senses changes in voltages generated in sensing nodes defined as crossings of the X-axis electrode lines and the Y-axis electrode lines through the Y-axis electrode lines, thereby deciding whether or not a touch operation is performed.

In the mutual capacitive touch sensor, a mutual capacitance generated in touch recognition of the mutual capacitive touch sensor is very small, but a parasitic capacitance between gate line and data lines constituting the display device is very large. Therefore, it is difficult to accurately recognize a touch position because of the parasitic capacitance.

Further, because a plurality of touch driving lines for a touch drive and a plurality of touch sensing lines for a touch sensing have to be formed on the common electrode for the multi-touch recognition of the mutual capacitive touch sensor, the mutual capacitive touch sensor requires a very complex line structure.

On the other hand, because the self capacitive touch sensor has a simpler line structure than the mutual capacitive touch sensor, touch accuracy may increase. Hence, the self capacitive touch sensor has been widely used, if necessary or desired.

A related art self capacitive touch sensor integrated type liquid crystal display (hereinafter referred to as "touch sensor integrated type display device") is described below with reference to FIGS. 1 to 4. FIG. 1 is a plane view of a related art touch sensor integrated type display device. FIG. 2 is a plane view enlarging a partial area R1 shown in FIG. 1. FIG. 3 is a cross-sectional view taken along line I-I' of FIG. 2. FIG. 4 is a waveform diagram showing a ripple generated in a common voltage due to a parasitic capacitance formed between a touch electrode (common electrode) and gate and data lines in the related art touch sensor integrated type display device.

As shown in FIG. 1, the related art touch sensor integrated type display device includes an active area AA, in which touch electrodes are formed and data is displayed, and a bezel area BA positioned outside the active area AA. In the bezel area BA, various wires and a source driving and touch sensing integrated circuit (IC) 10 are formed.

The active area AA includes a plurality of touch electrodes Tx11-Tx14, Tx21-Tx24, Tx31-Tx34, Tx41-Tx44, and Tx51-T54 divided in a first direction (for example, x-axis direction) and a second direction (for example, y-axis direction) crossing the first direction and a plurality of touch routing wires TW11-TW14, TW21-TW24, TW31-TW34, TW41-TW44, and TW51-TW54, which are respectively connected to the plurality of touch electrodes Tx11-Tx14, Tx21-Tx24, Tx31-Tx34, Tx41-Tx44, and Tx51-T54 and are arranged in parallel with one another in the second direction.

The plurality of touch electrodes Tx11-Tx14, Tx21-Tx24, Tx31-Tx34, Tx41-Tx44, and Tx51-T54 inside the active area AA are formed by dividing a common electrode of the display device, and thus operate as common electrodes in a display drive for displaying data and operate as touch electrodes in a touch drive for recognizing a touch position.

The bezel area BA positioned outside the active area AA includes the source driving and touch sensing IC 10 and various wires. In the display drive, a driving IC for the display device and the source driving and touch sensing IC 10 drive gate lines (not shown) of the display device, supply display data to data lines (not shown), and supply a common voltage to the touch electrodes (or the common electrodes). In the touch drive, the source driving and touch sensing IC 10 supplies a touch driving voltage to the touch electrodes and scans changes in a capacitance of each touch electrode before and after a touch operation, thereby determining a position of the touched touch electrode. The various wires include the touch routing wires TW11-TW14, TW21-TW24, TW31-TW34, TW41-TW44, and TW51-TW54 connected to the touch electrodes Tx11-Tx14, Tx21-Tx24, Tx31-Tx34, Tx41-Tx44, and Tx51-T54, the gate lines connected to the source driving and touch sensing IC 10, and the data lines.

As shown in FIGS. 2 and 3, the related art touch sensor integrated type display device includes a thin film transistor TFT formed on a substrate SUB, a pixel electrode Px connected to a drain electrode DE of the thin film transistor TFT, and the touch electrode Tx11 which overlaps the pixel electrode Px and forms a horizontal electric field.

The thin film transistor TFT includes a gate electrode GE extending from a gate line GL formed on the substrate SUB, a semiconductor active layer A which is formed on a gate insulating layer GI covering the gate line GL and the gate electrode GE and overlaps a portion of the gate electrode GE, and a source electrode SE and the drain electrode DE which are formed on the semiconductor active layer A and are separated from each other by a predetermined distance. A data line DL is formed on the same layer as the drain electrode DE.

The pixel electrode Px is formed on the gate insulating layer GI and the drain electrode DE and is directly connected to the drain electrode DE.

The data line DL, the source electrode SE and the drain electrode DE of the thin film transistor TFT, and the pixel electrode Px are covered with a first passivation layer PAS1. The touch routing wire TW11 is formed on the first passivation layer PAS1 and overlaps the data line DL. The touch routing wire TW11 on the first passivation layer PAS1 is covered with a second passivation layer PAS2.

The touch electrode Tx11 is formed on the second passivation layer PAS2. The touch electrode Tx11 has a plurality of slits SL, so as to form the horizontal electric field along with the pixel electrode Px formed on the gate insulating layer GI.

In the related art touch sensor integrated type display device having the above-described structure, when a finger or a conductive metal such as a stylus pen touches the active area AA of the display device, the touch sensor integrated type display device may sense changes in a capacitance of the touch electrode before and after the touch electrode close to a touch position is touched, and may determine the touch position. Namely, the touch sensor integrated type display device may apply a driving pulse to the touch electrodes Tx11-Tx14, Tx21-Tx24, Tx31-Tx34, Tx41-Tx44, and Tx51-T54 formed in the active area AA and then may sense changes in a self capacitance of each touch electrode before and after each of the touch electrodes Tx11-Tx14, Tx21-Tx24, Tx31-Tx34, Tx41-Tx44, and Tx51-T54 is touched, thereby determining the touch position.

However, as the size and a resolution of the related art touch sensor integrated type display device increase, a parasitic capacitance between the touch electrode (the common electrode) and the gate and data lines increases. As shown in FIG. 4, the parasitic capacitance generates a ripple in the common voltage and adversely affects an image displayed on the display device. A common voltage compensation circuit may be designed so as to prevent the ripple. However, in this instance, there were the problems, in which the size of the bezel area may increase, or a parasitic capacitance may be additionally generated by the design of the common voltage compensation circuit.

Further, in the related art touch sensor integrated type display device, a relatively large step coverage is generated between a non-formation area of the data lines and the touch routing wires and a formation area of the data lines and the touch routing wires because of a vertical stack structure of the data lines and the touch routing wires formed in the active area. Thus, there were the additional problems, in which a small amount of liquid crystals are distributed in an area corresponding to the formation area of the data lines and the touch routing wires, or a light leakage phenomenon may be generated by the step coverage.

SUMMARY OF THE INVENTION

Accordingly, the present invention is directed to a touch sensor integrated type display device that substantially obviates one or more of the problems due to limitations and disadvantages of the related art.

An object of the present invention is to provide a touch sensor integrated type display device capable of preventing a reduction in image quality by preventing a ripple from being generated in a common voltage.

Another object of the present invention is to provide a touch sensor integrated type display device capable of uniformly distributing liquid crystals and preventing a light leakage phenomenon by minimizing a step coverage between a formation area of data lines and touch routing wires and a non-formation area of the data lines and the touch routing wires.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensor integrated type display device comprises a plurality of gate lines and a plurality of data lines, which are arranged to cross over each other, a plurality of pixel electrodes respectively disposed in areas defined by the crossing of the plurality of gate lines and the plurality of data lines, a plurality of touch electrodes serving as common electrodes, each of which overlaps some of the plurality of pixel electrodes in an active area, and a routing wire which is arranged on at least one side of each of first and second data lines related to the some pixel electrodes corresponding to each touch electrode serving as the common electrode in parallel with the first and second data lines, wherein the routing wire is connected to the touch electrode serving as the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. In the following description, a touch sensor integrated type liquid crystal display is used as an example of a touch sensor integrated type display device.

Figure 1:
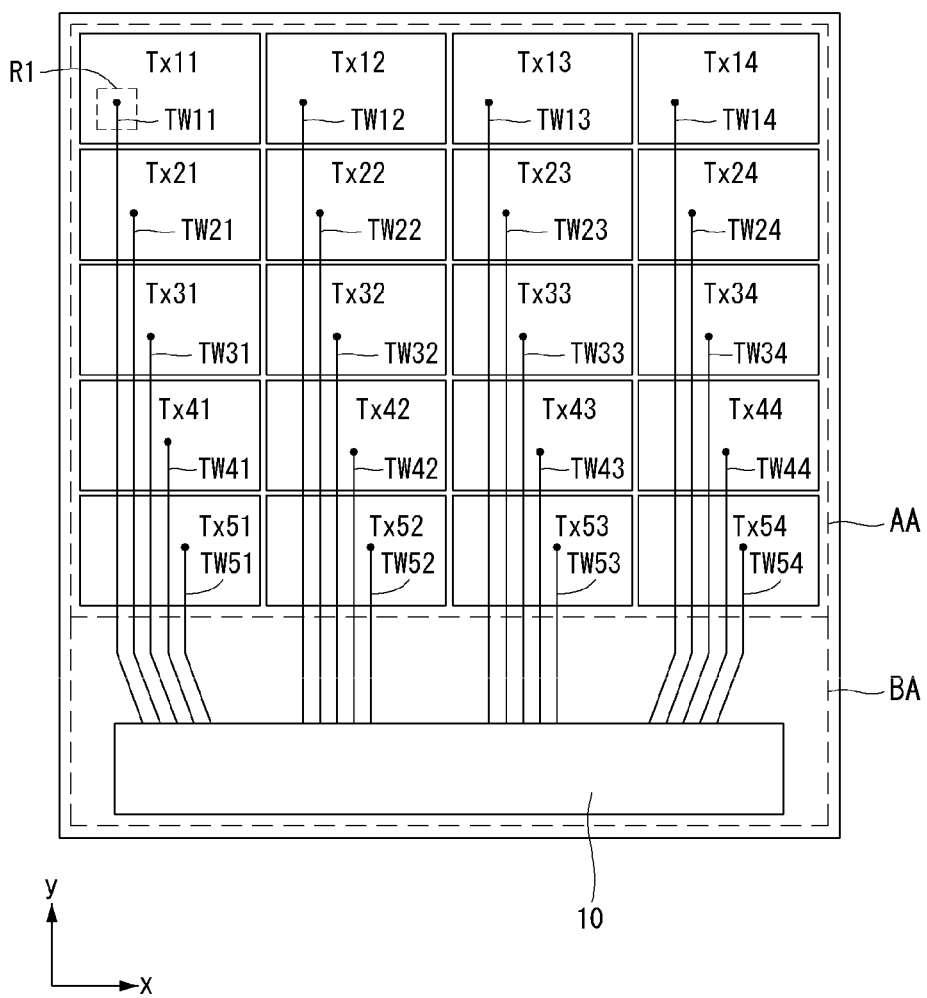
FIG. 1 is a plane view schematically showing a related art touch sensor integrated type display device.
Figure 2:
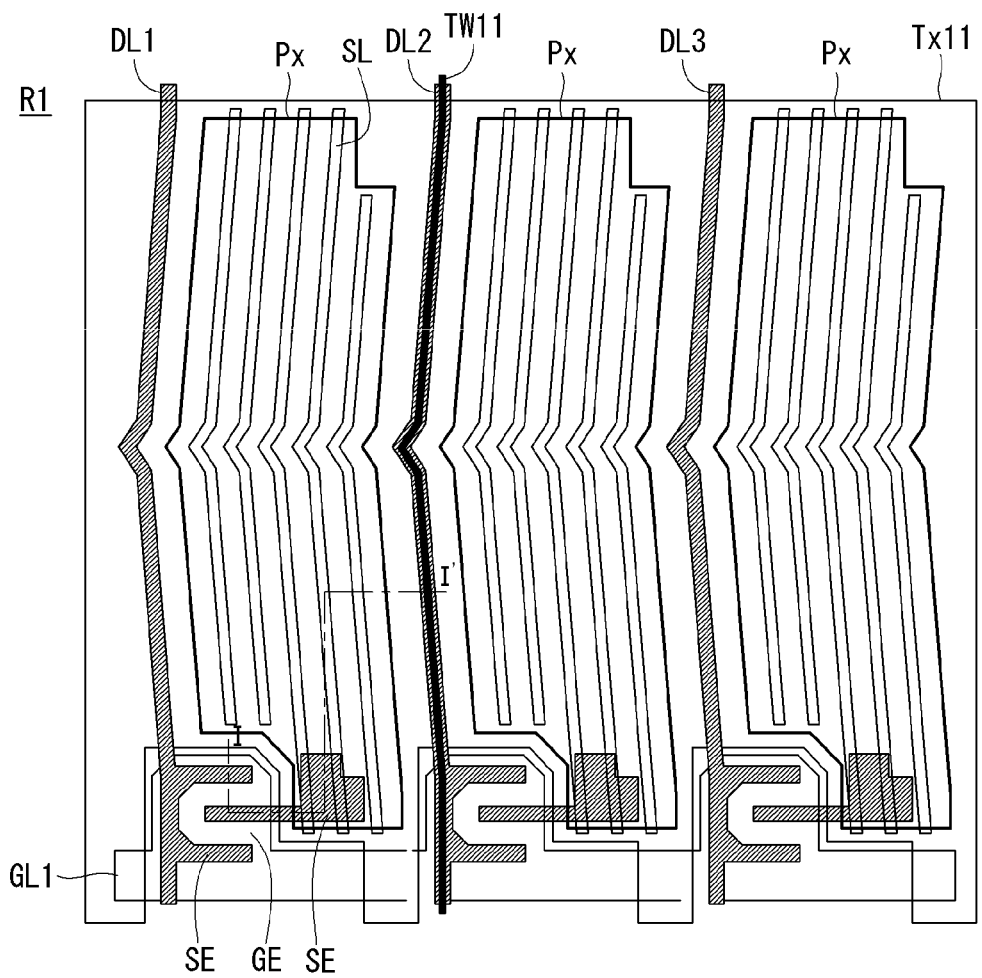
FIG. 2 is a plane view enlarging a partial area R1 shown in FIG. 1.
Figure 3:
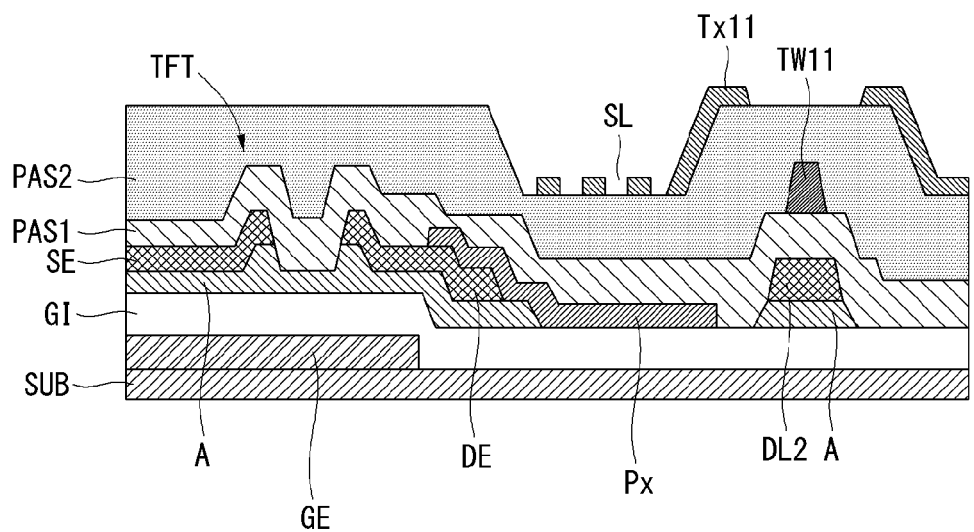
FIG. 3 is a cross-sectional view taken along line I-I' of FIG. 2.
Figure 4:
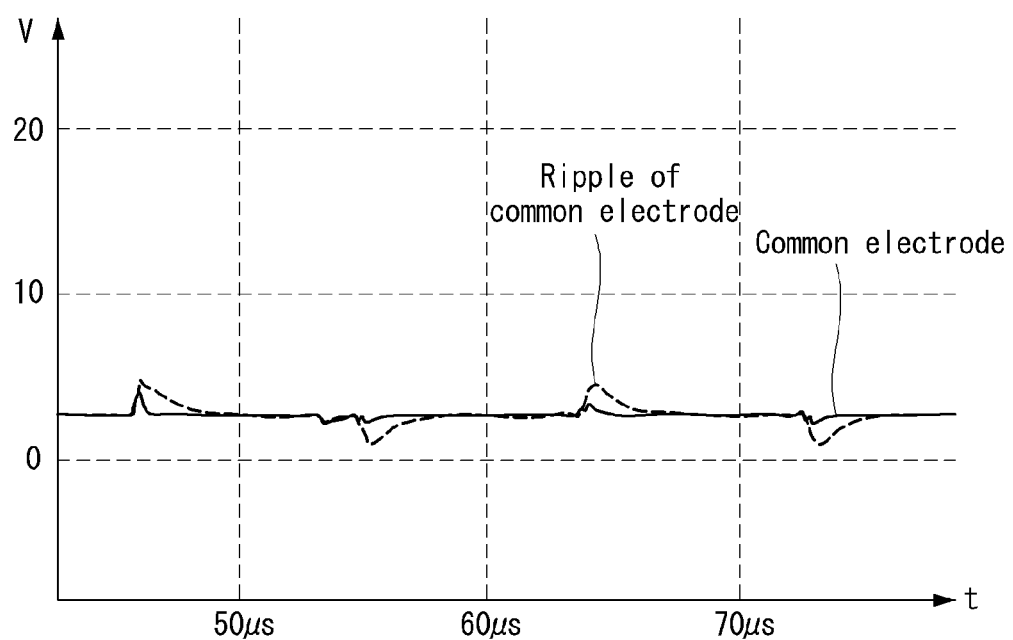
FIG. 4 is a waveform diagram showing a ripple generated in a common voltage due to a parasitic capacitance formed between a touch electrode (common electrode) and gate and data lines in the related art touch sensor integrated type display device.
Figure 5:
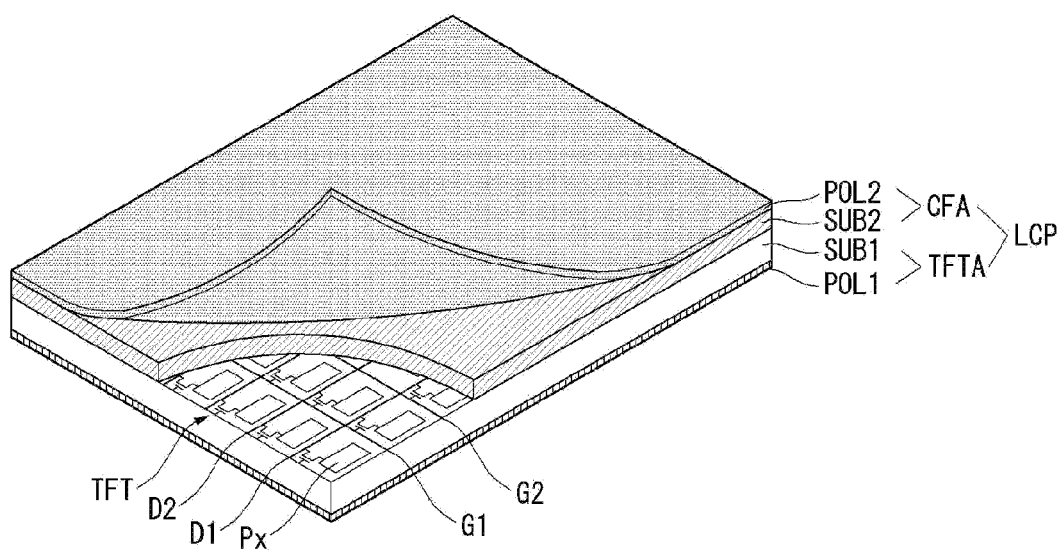
FIG. 5 is a partial exploded perspective view schematically showing a touch sensor integrated type display device according to an exemplary embodiment of the invention.
Figure 6:
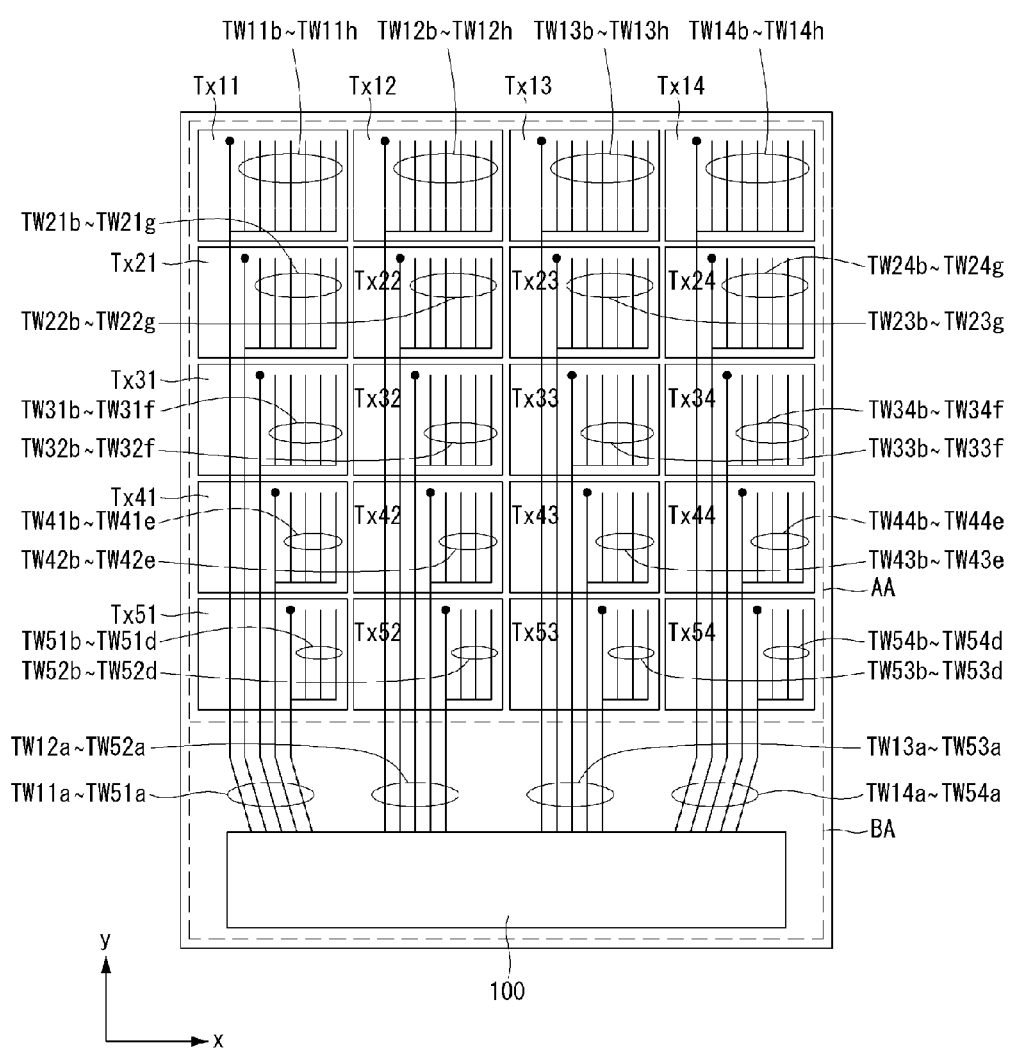
FIG. 6 is a plane view of a touch sensor integrated type display device according to an exemplary embodiment of the invention.

A touch sensor integrated type display device according to an exemplary embodiment of the invention is described with reference to FIGS. 5 and 6. FIG. 5 is a partial exploded perspective view schematically showing a touch sensor integrated type display device according to an exemplary embodiment of the invention. FIG. 6 is a plane view of a touch sensor integrated type display device according to an exemplary embodiment of the invention.

As shown in FIG. 5, the touch sensor integrated type display device according to the embodiment of the invention includes a liquid crystal display panel LCP having a thin film transistor (TFT) array TFTA and a color filter array CFA which are positioned opposite each other with a liquid crystal layer (not shown) interposed therebetween.

The TFT array TFTA includes a plurality of gate lines G1 and G2 which are formed in parallel in a first direction (for example, x-axis direction) on a first substrate SUB1, a plurality of data lines D1 and D2 which are formed in parallel in a second direction (for example, y-axis direction) to cross over the plurality of gate lines G1 and G2, thin film transistors TFT formed at crossings of the gate lines G1 and G2 and the data lines D1 and D2, a plurality of pixel electrodes Px for charging liquid crystal cells to a data voltage, and a plurality of common electrodes (not shown) positioned opposite the plurality of pixel electrodes Px.

The color filter array CFA includes black matrixes (not shown) and color filters (not shown), which are formed on a second substrate SUB2. Polarizing plates POL1 and POL2 are respectively attached to external surfaces of the first substrate SUB1 and the second substrate SUB2 of the liquid crystal display panel LCP. Alignment layers (not shown) for setting a pre-tilt angle of liquid crystals are respectively formed on inner surfaces of the first and second substrates SUB1 and SUB2 contacting the liquid crystals. A column spacer may be formed between the TFT array TFTA and the color filter array CFA of the liquid crystal display panel LCP to maintain cell gaps of the liquid crystal cells.

The common electrodes are formed on the second substrate SUB2 in a vertical electric field driving manner, such as a twisted nematic (TN) mode and a vertical alignment (VA) mode. Further, the common electrodes are formed on the first substrate SUB1 along with the pixel electrodes Px in a horizontal electric field driving manner, such as an in-plane switching (IPS) mode and a fringe field switching (FFS) mode. In the following description, the embodiment of the invention is described based on the horizontal electric field driving manner as an example.

As shown in FIG. 6, the touch sensor integrated type display device according to the embodiment of the invention includes an active area AA and a bezel area BA positioned outside the active area AA. The active area AA is an area, in which touch electrodes serving as common electrodes are formed and data is displayed. The bezel area BA is an area, in which a source driving and touch sensing integrated circuit (IC) 100 and various wires are formed.

The active area AA of the touch sensor integrated type display device includes a plurality of touch electrodes serving as common electrodes (hereinafter abbreviated to "touch electrodes") Tx11-Tx14, Tx21-Tx24, Tx31-Tx34, Tx41-Tx44, and Tx51-Tx54 divided in the first direction (for example, x-axis direction) and the second direction (for example, y-axis direction) crossing the first direction, a plurality of main routing wires TW11a-TW14a, TW21a-TW24a, TW31a-TW34a, TW41a-TW44a, and TW51a-TW54a which are respectively connected to the plurality of touch electrodes Tx11-Tx14, Tx21-Tx24, Tx31-Tx34, Tx41-Tx44, and Tx51-Tx54 and are arranged in parallel with one another in the second direction, and a plurality of auxiliary routing wires TW11b-TW11h, TW12b-TW12h, TW13b-TW13h, TW14b-TW14h; TW21b-TW21g, TW22b-TW22g, TW23b-TW23g, TW24b-TW24g; TW31b-TW31f, TW32b-TW32f, TW33b-TW33f, TW34b-TW34f; TW41b-TW41e, TW42b-TW42e, TW43b-TW43e, TW44b-TW44e; and TW51b-TW51d, TW52b-TW52d, TW53b-TW53d, TW54b-TW54d which are respectively connected to the plurality of main routing wires TW11a-TW14a, TW21a-TW24a, TW31a-TW34a, TW41a-TW44a, and TW51a-TW54a and are respectively formed on the plurality of touch electrodes Tx11-Tx14, Tx21-Tx24, Tx31-Tx34, Tx41-Tx44, and Tx51-Tx54.

One main routing wire connected to each touch electrode and the plurality of auxiliary routing wires connected to the one main routing wire are disposed on each touch electrode. Hereinafter, a relationship between the touch electrodes arranged in the form of 5×4 matrix and the main routing wires and the auxiliary routing wires connected to the touch electrodes is described with reference to FIG. 6.

First, the 1-1 to 1-4 touch electrodes Tx11 to Tx14 disposed on a first row of the active area AA are described.

The 1-1 main routing wire TW11a connects the 1-1 touch electrode Tx11 disposed on the first row and a first column of the active area AA to the source driving and touch sensing IC 100. The plurality of 1-1 auxiliary routing wires TW11b-TW11h are connected to the 1-1 main routing wire TW11a. The 1-1 main routing wire TW11a is arranged in parallel with the data line and crosses over the touch electrodes Tx11, Tx21, Tx31, Tx41, and Tx51 disposed on the first column of the active area AA. The 1-1 auxiliary routing wires TW11b-TW11h are arranged in parallel with the data line and the 1-1 main routing wire TW11a and are disposed within an area of the 1-1 touch electrode Tx11.

The 1-2 main routing wire TW12a connects the 1-2 touch electrode Tx12 disposed on the first row and a second column of the active area AA to the source driving and touch sensing IC 100. The plurality of 1-2 auxiliary routing wires TW12b-TW12h are connected to the 1-2 main routing wire TW12a. The 1-2 main routing wire TW12a is arranged in parallel with the data line and crosses over the touch electrodes Tx12, Tx22, Tx32, Tx42, and Tx52 disposed on the second column of the active area AA. The 1-2 auxiliary routing wires TW12b-TW12h are arranged in parallel with the data line and the 1-2 main routing wire TW12a and are disposed within an area of the 1-2 touch electrode Tx12.

The 1-3 main routing wire TW13a connects the 1-3 touch electrode Tx13 disposed on the first row and a third column of the active area AA to the source driving and touch sensing IC 100. The plurality of 1-3 auxiliary routing wires TW13b-TW13h are connected to the 1-3 main routing wire TW13a. The 1-3 main routing wire TW13a is arranged in parallel with the data line and crosses over the touch electrodes Tx13, Tx23, Tx33, Tx43, and Tx53 disposed on the third column of the active area AA. The 1-3 auxiliary routing wires TW13b-TW13h are arranged in parallel with the data line and the 1-3 main routing wire TW13a and are disposed within an area of the 1-3 touch electrode Tx13.

The 1-4 main routing wire TW14a connects the 1-4 touch electrode Tx14 disposed on the first row and a fourth column of the active area AA to the source driving and touch sensing IC 100. The plurality of 1-4 auxiliary routing wires TW14b-TW14h are connected to the 1-4 main routing wire TW14a. The 1-4 main routing wire TW14a is arranged in parallel with the data line and crosses over the touch electrodes Tx14, Tx24, Tx34, Tx44, and Tx54 disposed on the fourth column of the active area AA. The 1-4 auxiliary routing wires TW14b-TW14h are arranged in parallel with the data line and the 1-4 main routing wire TW14a and are disposed within an area of the 1-4 touch electrode Tx14.

Next, the 2-1 to 2-4 touch electrodes Tx21 to Tx24 disposed on a second row of the active area AA are described.

The 2-1 main routing wire TW21a connects the 2-1 touch electrode Tx21 disposed on the second row and the first column of the active area AA to the source driving and touch sensing IC 100. The plurality of 2-1 auxiliary routing wires TW21b-TW21g are connected to the 2-1 main routing wire TW21a are disposed on the 2-1 touch electrode Tx21. The 2-1 main routing wire TW21a is arranged in parallel with the 1-1 main routing wire TW11a extending from the 1-1 touch electrode Tx11 and the data line and crosses over the touch electrodes Tx21, Tx31, Tx41, and Tx51 disposed on the first column of the active area AA. The 2-1 auxiliary routing wires TW21b-TW21g are arranged in parallel with the data line, the 1-1 main routing wire TW11a, and the 2-1 main routing wire TW21a and are disposed within an area of the 2-1 touch electrode Tx21.

The 2-2 main routing wire TW22a connects the 2-2 touch electrode Tx22 disposed on the second row and the second column of the active area AA to the source driving and touch sensing IC 100. The plurality of 2-2 auxiliary routing wires TW22b-TW22g are connected to the 2-2 main routing wire TW22a. The 2-2 main routing wire TW22a is arranged in parallel with the 1-2 main routing wire TW12a extending from the 1-2 touch electrode Tx12 and the data line and crosses over the touch electrodes Tx22, Tx32, Tx42, and Tx52 disposed on the second column of the active area AA. The 2-2 auxiliary routing wires TW22b-TW22g are arranged in parallel with the data line, the 1-2 main routing wire TW12a, and the 2-2 main routing wire TW22a and are disposed within an area of the 2-2 touch electrode Tx22.

The 2-3 main routing wire TW23a connects the 2-3 touch electrode Tx23 disposed on the second row and the third column of the active area AA to the source driving and touch sensing IC 100. The plurality of 2-3 auxiliary routing wires TW23b-TW23g are connected to the 2-3 main routing wire TW23a. The 2-3 main routing wire TW23a is arranged in parallel with the 1-3 main routing wire TW13a extending from the 1-3 touch electrode Tx13 and the data line and crosses over the touch electrodes Tx23, Tx33, Tx43, and Tx53 disposed on the third column of the active area AA. The 2-3 auxiliary routing wires TW23b-TW23g are arranged in parallel with the data line, the 1-3 main routing wire TW13a, and the 2-3 main routing wire TW23a and are disposed within an area of the 2-3 touch electrode Tx23.

The 2-4 main routing wire TW24a connects the 2-4 touch electrode Tx24 disposed on the second row and the fourth column of the active area AA to the source driving and touch sensing IC 100. The plurality of 2-4 auxiliary routing wires TW24b-TW24g are connected to the 2-4 main routing wire TW24a. The 2-4 main routing wire TW24a is arranged in parallel with the 1-4 main routing wire TW14a extending from the 1-4 touch electrode Tx14 and the data line and crosses over the touch electrodes Tx24, Tx34, Tx44, and Tx54 disposed on the fourth column of the active area AA. The 2-4 auxiliary routing wires TW24b-TW24g are arranged in parallel with the data line, the 1-4 main routing wire TW14a, and the 2-4 main routing wire TW24a and are disposed within an area of the 2-4 touch electrode Tx24.

Next, the 3-1 to 3-4 touch electrodes Tx31 to Tx34 disposed on a third row of the active area AA are described.

The 3-1 main routing wire TW31a connects the 3-1 touch electrode Tx31 disposed on the third row and the first column of the active area AA to the source driving and touch sensing IC 100. The plurality of 3-1 auxiliary routing wires TW31b-TW31f are connected to the 3-1 main routing wire TW31a. The 3-1 main routing wire TW31a is arranged in parallel with the 1-1 main routing wire TW11a extending from the 1-1 touch electrode Tx11, the 2-1 main routing wire TW21a extending from the 2-1 touch electrode Tx21, and the data line and crosses over the touch electrodes Tx31, Tx41, and Tx51 disposed on the first column of the active area AA. The 3-1 auxiliary routing wires TW31b-TW31f are arranged in parallel with the data line, the 1-1 main routing wire TW11a, the 2-1 main routing wire TW21a, and the 3-1 main routing wire TW31a and are disposed within an area of the 3-1 touch electrode Tx31.

The 3-2 main routing wire TW32a connects the 3-2 touch electrode Tx32 disposed on the third row and the second column of the active area AA to the source driving and touch sensing IC 100. The plurality of 3-2 auxiliary routing wires TW32b-TW32f are connected to the 3-2 main routing wire TW32a. The 3-2 main routing wire TW32a is arranged in parallel with the 1-2 main routing wire TW12a extending from the 1-2 touch electrode Tx12, the 2-2 main routing wire TW22a extending from the 2-2 touch electrode Tx22, and the data line and crosses over the touch electrodes Tx32, Tx42, and Tx52 disposed on the second column of the active area AA. The 3-2 auxiliary routing wires TW32b-TW32f are arranged in parallel with the data line, the 1-2 main routing wire TW12a, the 2-2 main routing wire TW22a, and the 3-2 main routing wire TW32a and are disposed within an area of the 3-2 touch electrode Tx32.

The 3-3 main routing wire TW33a connects the 3-3 touch electrode Tx33 disposed on the third row and the third column of the active area AA to the source driving and touch sensing IC 100. The plurality of 3-3 auxiliary routing wires TW33b-TW33f are connected to the 3-3 main routing wire TW33a. The 3-3 main routing wire TW33a is arranged in parallel with the 1-3 main routing wire TW13a extending from the 1-3 touch electrode Tx13, the 2-3 main routing wire TW23a extending from the 2-3 touch electrode Tx23, and the data line and crosses over the touch electrodes Tx33, Tx43, and Tx53 disposed on the third column of the active area AA. The 3-3 auxiliary routing wires TW33b-TW33f are arranged in parallel with the data line, the 1-3 main routing wire TW13a, the 2-3 main routing wire TW23a, and the 3-3 main routing wire TW33a and are disposed within an area of the 3-3 touch electrode Tx33.

The 3-4 main routing wire TW34a connects the 3-4 touch electrode Tx34 disposed on the third row and the fourth column of the active area AA to the source driving and touch sensing IC 100. The plurality of 3-4 auxiliary routing wires TW34b-TW34f are connected to the 3-4 main routing wire TW34a. The 3-4 main routing wire TW34a is arranged in parallel with the 1-4 main routing wire TW14a extending from the 1-4 touch electrode Tx14, the 2-4 main routing wire TW24a extending from the 2-4 touch electrode Tx24, and the data line and crosses over the touch electrodes Tx34, Tx44, and Tx54 disposed on the fourth column of the active area AA. The 3-4 auxiliary routing wires TW34b-TW34f are arranged in parallel with the data line, the 1-4 main routing wire TW14a, the 2-4 main routing wire TW24a, and the 3-4 main routing wire TW34a and are disposed within an area of the 3-4 touch electrode Tx34.

Next, the 4-1 to 4-4 touch electrodes Tx41 to Tx44 disposed on a fourth row of the active area AA are described.

The 4-1 main routing wire TW41a connects the 4-1 touch electrode Tx41 disposed on the fourth row and the first column of the active area AA to the source driving and touch sensing IC 100. The plurality of 4-1 auxiliary routing wires TW41b-TW41e connected to the 4-1 main routing wire TW41a. The 4-1 main routing wire TW41a is arranged in parallel with the 1-1 main routing wire TW11a extending from the 1-1 touch electrode Tx11, the 2-1 main routing wire TW21a extending from the 2-1 touch electrode Tx21, the 3-1 main routing wire TW31a extending from the 3-1 touch electrode Tx31, and the data line and crosses over the touch electrodes Tx41 and Tx51 disposed on the first column of the active area AA. The 4-1 auxiliary routing wires TW41b-TW41e are arranged in parallel with the data line, the 1-1 main routing wire TW11a, the 2-1 main routing wire TW21a, the 3-1 main routing wire TW31a, and the 4-1 main routing wire TW41a and are disposed within an area of the 4-1 touch electrode Tx41.

The 4-2 main routing wire TW42a connects the 4-2 touch electrode Tx42 disposed on the fourth row and the second column of the active area AA to the source driving and touch sensing IC 100. The plurality of 4-2 auxiliary routing wires TW42b-TW42e are connected to the 4-2 main routing wire TW42a. The 4-2 main routing wire TW42a is arranged in parallel with the 1-2 main routing wire TW12a extending from the 1-2 touch electrode Tx12, the 2-2 main routing wire TW22a extending from the 2-2 touch electrode Tx22, the 3-2 main routing wire TW32a extending from the 3-2 touch electrode Tx32, and the data line and crosses over the touch electrodes Tx42 and Tx52 disposed on the second column of the active area AA. The 4-2 auxiliary routing wires TW42b-TW42e are arranged in parallel with the data line, the 1-2 main routing wire TW12a, the 2-2 main routing wire TW22a, the 3-2 main routing wire TW32a, and the 4-2 main routing wire TW42a and are disposed within an area of the 4-2 touch electrode Tx42.

The 4-3 main routing wire TW43a connects the 4-3 touch electrode Tx43 disposed on the fourth row and the third column of the active area AA to the source driving and touch sensing IC 100. The plurality of 4-3 auxiliary routing wires TW43b-TW43e are connected to the 4-3 main routing wire TW43a. The 4-3 main routing wire TW43a is arranged in parallel with the 1-3 main routing wire TW13a extending from the 1-3 touch electrode Tx13, the 2-3 main routing wire TW23a extending from the 2-3 touch electrode Tx23, the 3-3 main routing wire TW33a extending from the 3-3 touch electrode Tx33, and the data line and crosses over the touch electrodes Tx43 and Tx53 disposed on the third column of the active area AA. The 4-3 auxiliary routing wires TW43b-TW43e are arranged in parallel with the data line, the 1-3 main routing wire TW13a, the 2-3 main routing wire TW23a, the 3-3 main routing wire TW33a, and the 4-3 main routing wire TW43a and are disposed within an area of the 4-3 touch electrode Tx43.

The 4-4 main routing wire TW44a connects the 4-4 touch electrode Tx44 disposed on the fourth row and the fourth column of the active area AA to the source driving and touch sensing IC 100. The plurality of 4-4 auxiliary routing wires TW44b-TW44e are connected to the 4-4 main routing wire TW44a. The 4-4 main routing wire TW44a is arranged in parallel with the 1-4 main routing wire TW14a extending from the 1-4 touch electrode Tx14, the 2-4 main routing wire TW24a extending from the 2-4 touch electrode Tx24, the 3-4 main routing wire TW34a extending from the 3-4 touch electrode Tx34, and the data line and crosses over the touch electrodes Tx44 and Tx54 disposed on the fourth column of the active area AA. The 4-4 auxiliary routing wires TW44b-TW44e are arranged in parallel with the data line, the 1-4 main routing wire TW14a, the 2-4 main routing wire TW24a, the 3-4 main routing wire TW34a, and the 4-4 main routing wire TW44a and are disposed within an area of the 4-4 touch electrode Tx44.

Next, the 5-1 to 5-4 touch electrodes Tx51 to Tx54 disposed on a fifth row of the active area AA are described.

The 5-1 main routing wire TW51a connects the 5-1 touch electrode Tx51 disposed on the fifth row and the first column of the active area AA to the source driving and touch sensing IC 100. The plurality of 5-1 auxiliary routing wires TW51b-TW51d are connected to the 5-1 main routing wire TW51a. The 5-1 main routing wire TW51a is arranged in parallel with the 1-1 main routing wire TW11a extending from the 1-1 touch electrode Tx11, the 2-1 main routing wire TW21a extending from the 2-1 touch electrode Tx21, the 3-1 main routing wire TW31a extending from the 3-1 touch electrode Tx31, the 4-1 main routing wire TW41a extending from the 4-1 touch electrode Tx41, and the data line and crosses over the touch electrode Tx51 disposed on the first column of the active area AA. The 5-1 auxiliary routing wires TW51b-TW51d are arranged in parallel with the data line, the 1-1 main routing wire TW11a, the 2-1 main routing wire TW21a, the 3-1 main routing wire TW31a, the 4-1 main routing wire TW41a, and the 5-1 main routing wire TW51a and are disposed within an area of the 5-1 touch electrode Tx51.

The 5-2 main routing wire TW52a connects the 5-2 touch electrode Tx52 disposed on the fifth row and the second column of the active area AA to the source driving and touch sensing IC 100. The plurality of 5-2 auxiliary routing wires TW52b-TW52d are connected to the 5-2 main routing wire TW52a. The 5-2 main routing wire TW52a is arranged in parallel with the 1-2 main routing wire TW12a extending from the 1-2 touch electrode Tx12, the 2-2 main routing wire TW22a extending from the 2-2 touch electrode Tx22, the 3-2 main routing wire TW32a extending from the 3-2 touch electrode Tx32, the 4-2 main routing wire TW42a extending from the 4-2 touch electrode Tx42, and the data line and crosses over the touch electrode Tx52 disposed on the second column of the active area AA. The 5-2 auxiliary routing wires TW52b-TW52d are arranged in parallel with the data line, the 1-2 main routing wire TW12a, the 2-2 main routing wire TW22a, the 3-2 main routing wire TW32a, the 4-2 main routing wire TW42a, and the 5-2 main routing wire TW52a and are disposed within an area of the 5-2 touch electrode Tx52.

The 5-3 main routing wire TW53a connects the 5-3 touch electrode Tx53 disposed on the fifth row and the third column of the active area AA to the source driving and touch sensing IC 100. The plurality of 5-3 auxiliary routing wires TW53b-TW53d are connected to the 5-3 main routing wire TW53a. The 5-3 main routing wire TW53a is arranged in parallel with the 1-3 main routing wire TW13a extending from the 1-3 touch electrode Tx13, the 2-3 main routing wire TW23a extending from the 2-3 touch electrode Tx23, the 3-3 main routing wire TW33a extending from the 3-3 touch electrode Tx33, the 4-3 main routing wire TW43a extending from the 4-3 touch electrode Tx43, and the data line and crosses over the touch electrode Tx53 disposed on the third column of the active area AA. The 5-3 auxiliary routing wires TW53b-TW53d are arranged in parallel with the data line, the 1-3 main routing wire TW13a, the 2-3 main routing wire TW23a, the 3-3 main routing wire TW33a, the 4-3 main routing wire TW43a, and the 5-3 main routing wire TW53a and are disposed within an area of the 5-3 touch electrode Tx53.

The 5-4 main routing wire TW54a connects the 5-4 touch electrode Tx54 disposed on the fifth row and the fourth column of the active area AA to the source driving and touch sensing IC 100. The plurality of 5-4 auxiliary routing wires TW54b-TW54d are connected to the 5-4 main routing wire TW54a. The 5-4 main routing wire TW54a is arranged in parallel with the 1-4 main routing wire TW14a extending from the 1-4 touch electrode Tx14, the 2-4 main routing wire TW24a extending from the 2-4 touch electrode Tx24, the 3-4 main routing wire TW34a extending from the 3-4 touch electrode Tx34, the 4-4 main routing wire TW44a extending from the 4-4 touch electrode Tx44, and the data line and crosses over the touch electrode Tx54 disposed on the fourth column of the active area AA. The 5-4 auxiliary routing wires TW54b-TW54d are arranged in parallel with the data line, the 1-4 main routing wire TW14a, the 2-4 main routing wire TW24a, the 3-4 main routing wire TW34a, the 4-4 main routing wire TW44a, and the 5-4 main routing wire TW54a and are disposed within an area of the 5-4 touch electrode Tx54.

The touch electrodes Tx11-Tx14, Tx21-Tx24, Tx31-Tx34, Tx41-Tx44, and Tx51-Tx54 disposed in the active area AA are formed by dividing the common electrode of the display device, and thus operate as the common electrodes in a display drive for displaying data and operate as the touch electrodes in a touch drive for recognizing a touch position. Namely, the touch electrodes are time-divided and driven.

Figure 7:
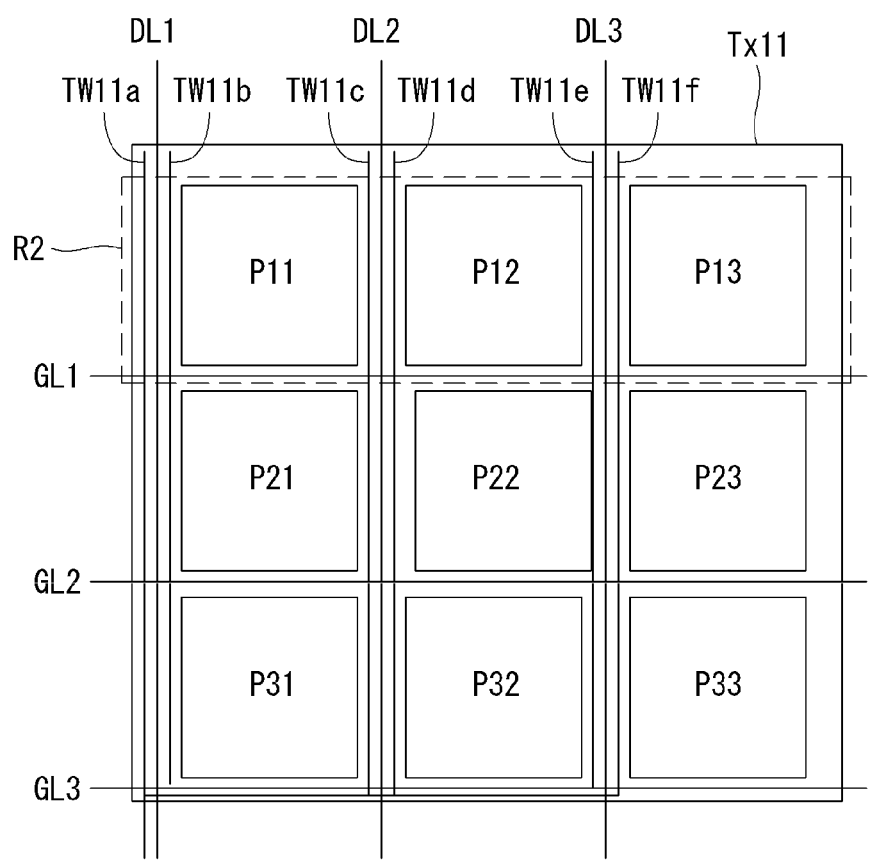
FIG. 7 is a cross-sectional view schematically showing a relationship between one touch electrode and a plurality of pixel electrodes in the touch sensor integrated type display device shown in FIG. 6.
Figure 8:
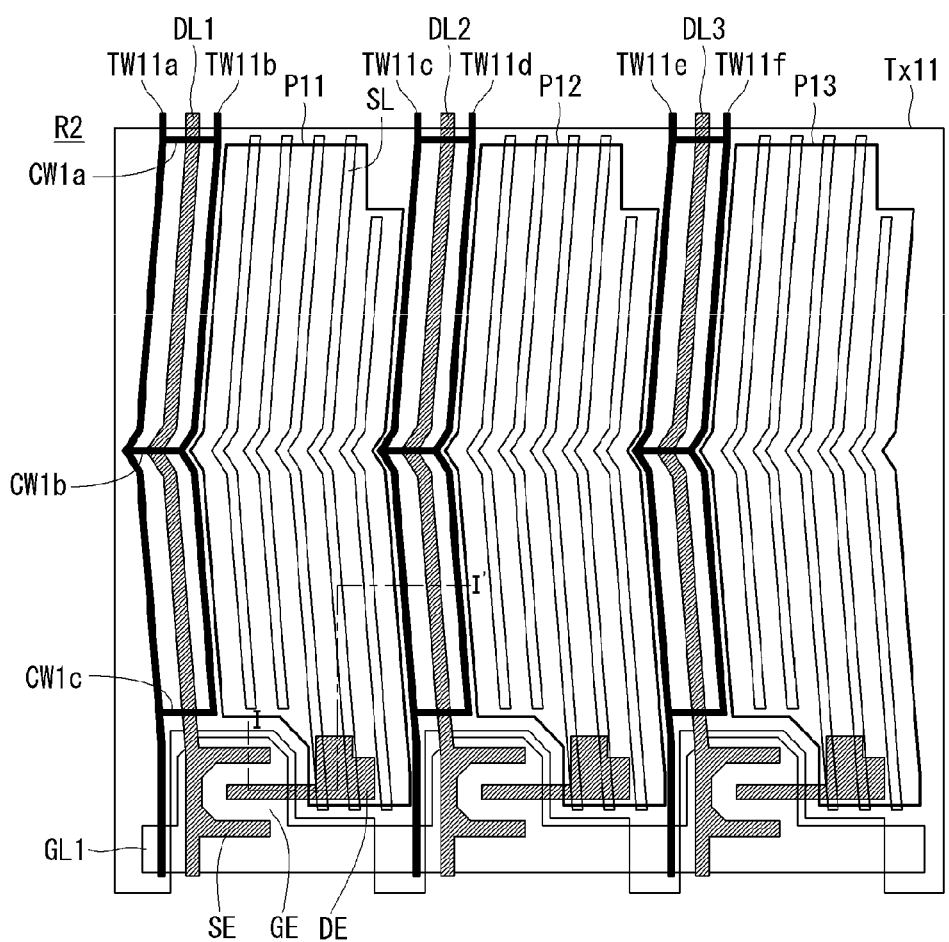
FIG. 8 is a plane view enlarging an area R2 shown in FIG. 7.
Figure 9:
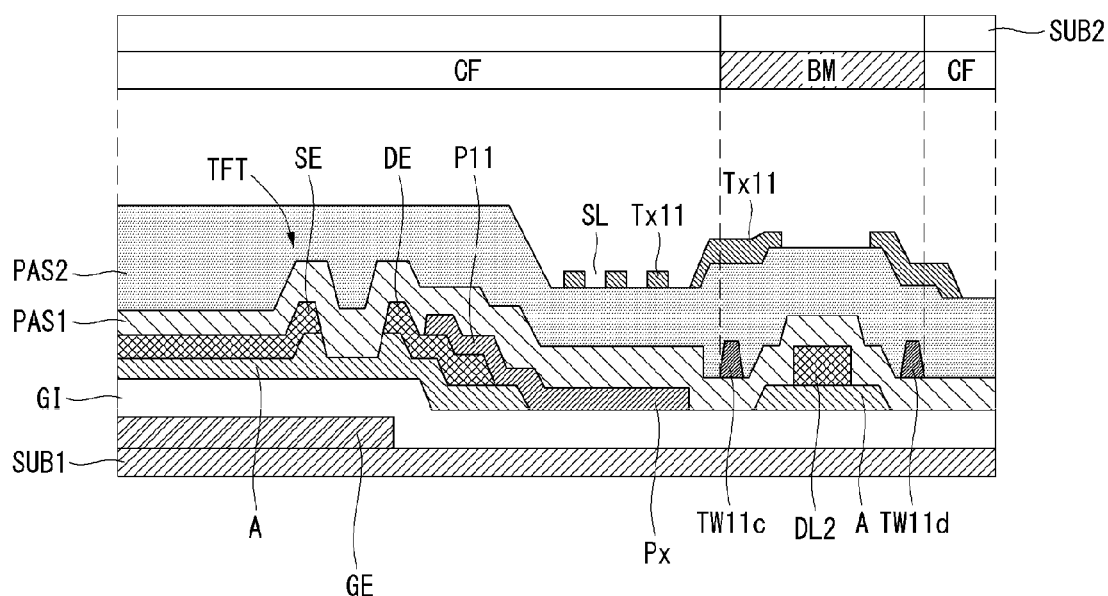
FIG. 9 is a cross-sectional view taken along line I-I' of FIG. 8.

The configuration of the touch sensor integrated type display device according to the embodiment of the invention is described in detail below with reference to FIGS. 7 to 9. FIG. 7 is a cross-sectional view schematically showing a relationship between one touch electrode Tx11 and the plurality of pixel electrodes P11 to P33 in the touch sensor integrated type display device shown in FIG. 6. FIG. 8 is a plane view enlarging an area R2 shown in FIG. 7. FIG. 9 is a cross-sectional view taken along line I-I' of FIG. 8.

As show in FIG. 7, in the touch sensor integrated type display device according to the embodiment of the invention, the 9 pixel electrodes P11 to P33 arranged in the form of 3×3 matrix correspond to one touch electrode Tx11. The pixel electrodes P11 to P33 are disposed in areas defined by the gate lines GL1 to GL3 arranged in the first direction and the data lines DL1 to DL3 arranged in the second direction crossing the first direction. FIG. 7 shows that the 9 pixel electrodes P11 to P33 correspond to one touch electrode Tx11, as an example. However, the embodiment of the invention is not limited thereto. For example, the number of pixel electrodes corresponding to one touch electrode may be adjusted, if necessary or desired.

The main routing wire TW11a and the auxiliary routing wire TW11b, the auxiliary routing wires TW11c and TW11d, and the auxiliary routing wires TW11e and TW11f are respectively disposed on both sides of each of the data lines DL1 to DL3. The main routing wire TW11a is connected to the touch electrode Tx11 through a contact hole, and the auxiliary routing wires TW11b, TW11c, TW11d, TW11e, and TW11f are directly connected to the main routing wire TW11a. FIG. 7 shows an example where the auxiliary routing wires TW11b, TW11c, TW11d, TW11e, and TW11f are directly connected to the main routing wire TW11a. Unlike FIG. 7, the auxiliary routing wires TW11b, TW11c, TW11d, TW11e, and TW11f may be connected to the touch electrode Tx11 through a contact hole. In this instance, the auxiliary routing wires TW11b, TW11c, TW11d, TW11e, and TW11f may be connected to the main routing wire TW11a through the touch electrode Tx11.

As shown in FIGS. 8 and 9, the 1-1 main routing wire TW11a is disposed on the left side of the first data line DL1, and the 1-1 auxiliary routing wire TW11b is disposed on the right side of the first data line DL1. The 1-1 main routing wire TW11a and the 1-1 auxiliary routing wire TW11b are connected to each other using at least one first connection line. For example, FIG. 8 shows three first connection lines CW1a, CW1b, and CW1c.

Further, the 1-1 auxiliary routing wire TW11c is disposed on the left side of the second data line DL2, and the 1-1 auxiliary routing wire TW11d is disposed on the right side of the second data line DL2. The 1-1 auxiliary routing wires TW11c and TW11d are connected to each other using at least one second connection line. For example, FIG. 8 shows three second connection lines CW2a, CW2b, and CW2c.

Further, the 1-1 auxiliary routing wire TW11e is disposed on the left side of the third data line DL3, and the 1-1 auxiliary routing wire TW11f is disposed on the right side of the third data line DL3. The 1-1 auxiliary routing wires TW11e and TW11f are connected to each other using at least one third connection line. For example, FIG. 8 shows three third connection lines CW3a, CW3b, and CW3c.

The first to third connection lines CW1a, CW1b, CW1c; CW2a, CW2b, CW2c; and CW3a, CW3b, CW3c reduce a resistance of the main routing wire TW11a and resistances of the auxiliary routing wires TW11b, TW11c, TW11d, TW11e, and TW11f.

The touch sensor integrated type display device according to the embodiment of the invention is described in detail below with reference to FIGS. 7 to 9. In the following description, the embodiment of the invention is described based on one pixel area for the sake of brevity and ease of reading.

As shown in FIGS. 7 to 9, the touch sensor integrated type display device according to the embodiment of the invention includes the gate lines GL1 to GL3 and the data lines DL1 to DL3 which are formed to cross over each other on the substrate SUB1 of the TFT array TFTA, thin film transistors TFT formed at crossings of the gate lines GL1 to GL3 and the data lines DL1 to DL3, the pixel electrodes P11, P12, and P13 formed in areas defined by the crossing of the gate lines GL1 to GL3 and the data lines DL1 to DL3, and the touch electrode Tx11 serving as the common electrode positioned opposite the pixel electrodes P11, P12, and P13. The touch electrode Tx11 serving as the common electrode performs a function of the common electrode in the display drive and performs a function of the touch electrode in the touch drive.

In the above configuration of the display device, the plurality of gate lines GL1 to GL3 are formed on the substrate SUB1 in parallel with one another, and a gate insulating layer GI is formed on the gate lines GL1 to GL3 to cover the gate lines GL1 to GL3. An active layer A, a source electrode SE, and a drain electrode DE constituting the thin film transistor TFT are formed on the gate insulating layer GI.

Namely, each thin film transistor TFT includes a gate electrode GE extending from each of the gate lines GL1 to GL3 formed on the substrate SUB1, the active layer A formed on the gate insulating layer GI covering each of the gate lines GL1 to GL3 and the gate electrode GE in an area corresponding to the gate electrode GE, and the source electrode SE and the drain electrode DE which are separated from each other on the gate insulating layer GI so as to expose a portion of the active layer A. The source electrode SE extends from each of the data lines DL1 to DL3.

The embodiment of the invention has described, as an example, a thin film transistor having a gate bottom structure, in which the gate electrode is formed under the source and drain electrodes, but is not limited to this example. The embodiment of the invention should be understood that a thin film transistor having a gate top structure, in which the gate electrode is formed on the source and drain electrodes, is available. Since the thin film transistor having the gate top structure is already well known, a detailed description thereof will be omitted.

The pixel electrode P11 is formed on the gate insulating layer GI, on which the thin film transistors TFT and the data lines DL1 to DL3 are formed, so that the pixel electrode P11 is connected to the drain electrode DE of the thin film transistor TFT. A first passivation layer PAS1 is formed to cover the source electrodes SE and the drain electrodes DE of the thin film transistors TFT, the data lines DL1 to DL3, and the pixel electrodes P11, P12, and P13. On the first passivation layer PAS1, the main routing wire TW11a and the auxiliary routing wire TW11b on both sides of the first data line DL1, the auxiliary routing wires TW11c and TW11d on both sides of the second data line DL2, and the auxiliary routing wires TW11e and TW11f on both sides of the third data line DL3 are formed in parallel with the data lines DL1 to DL3. All of the auxiliary routing wires TW11b, TW11c, TW11d, TW11e, and TW11f corresponding to one pixel electrode are connected to the main routing wire TW11a. Further, the main routing wire TW11a and the auxiliary routing wire TW11b and pairs of the auxiliary routing wires TW11c, TW11d; and TW11e, TW11f disposed on both sides of the data lines DL1 to DL3 overlap a black matrix BM formed on the second substrate SUB2 of the color filter array CFA, thereby preventing a reduction in an aperture ratio.

A second passivation layer PAS2 is formed on the first passivation layer PAS1, on which the main routing wire TW11a and the auxiliary routing wires TW11b, TW11c, TW11d, TW11e, and TW11f are formed, to cover the main routing wire TW11a and the auxiliary routing wires TW11b, TW11c, TW11d, TW11e, and TW11f. The second passivation layer PAS2 has at least one contact hole (not shown) exposing a portion of the main routing wire TW11a.

The touch electrode Tx11 serving as the common electrode is formed on the second passivation layer PAS2 to overlap the pixel electrodes P11, P12, and P13. The touch electrode Tx11 serving as the common electrode has a plurality of slits SL, so that it is easy to form a horizontal electric field between the touch electrode Tx11 and the pixel electrodes P11, P12, and P13.

The touch electrode Tx11 serving as the common electrode is connected to the main routing wire TW11a exposed through the contact hole of the second passivation layer PAS2.

In the touch sensor integrated type display device according to the embodiment of the invention, the main routing wire TW11a and the auxiliary routing wire TW11b are disposed on both sides of one data line (DL1, for example) corresponding to one touch electrode Tx11, the auxiliary routing wires TW11c, TW11d; and TW11e, TW11f are respectively disposed on both sides of other data lines (DL2 and DL3, for example), the auxiliary routing wires TW11b, TW11c, TW11d, TW11e, and TW11f are connected to the main routing wire TW11a, and the main routing wire TW11a is connected to the touch electrode Tx11 through the contact hole.

However, the connection structure of the main routing wire TW11a, the auxiliary routing wires TW11b, TW11c, TW11d, TW11e, and TW11f, and the touch electrode Tx11 is not limited to the connection structure described above.

For example, the auxiliary routing wires TW11b, TW11c, TW11d, TW11e, and TW11f may not be directly connected to the main routing wire TW11a and may be connected to the touch electrode Tx11 through another contact hole. Hence, the auxiliary routing wires TW11b, TW11c, TW11d, TW11e, and TW11f may be connected to the main routing wire TW11a connected to the touch electrode Tx11.

Alternatively, the main routing wire TW11a may be connected to the touch electrode Tx11, and the auxiliary routing wire TW11b and the pairs of auxiliary routing wires TW11c, TW11d; and TW11e, TW11f may be connected to the touch electrode Tx11.

Alternatively, the main routing wire TW11a may be connected to the touch electrode Tx11, and at least one of the auxiliary routing wire TW11b and the pairs of auxiliary routing wires TW11c, TW11d; and TW11e, TW11f may be connected to the touch electrode Tx11. The remaining auxiliary routing wires may be connected to the main routing wire TW11a.

Alternatively, the auxiliary routing wire TW11b and the pairs of auxiliary routing wires TW11c, TW11d; and TW11e, TW11f may be directly connected to the touch electrode Tx11, and the main routing wire TW11a may be connected to at least one of the auxiliary routing wire TW11b and the pairs of auxiliary routing wires TW11c, TW11d; and TW11e, TW11f.

Accordingly, although the embodiment of the invention does not directly describe the connection structure of the main routing wire TW11a, the auxiliary routing wires TW11b, TW11c, TW11d, TW11e, and TW11f, and the touch electrode Tx11, the embodiment of the invention should be understood that the connection structure is included in the embodiment of the invention.

Figure 10:
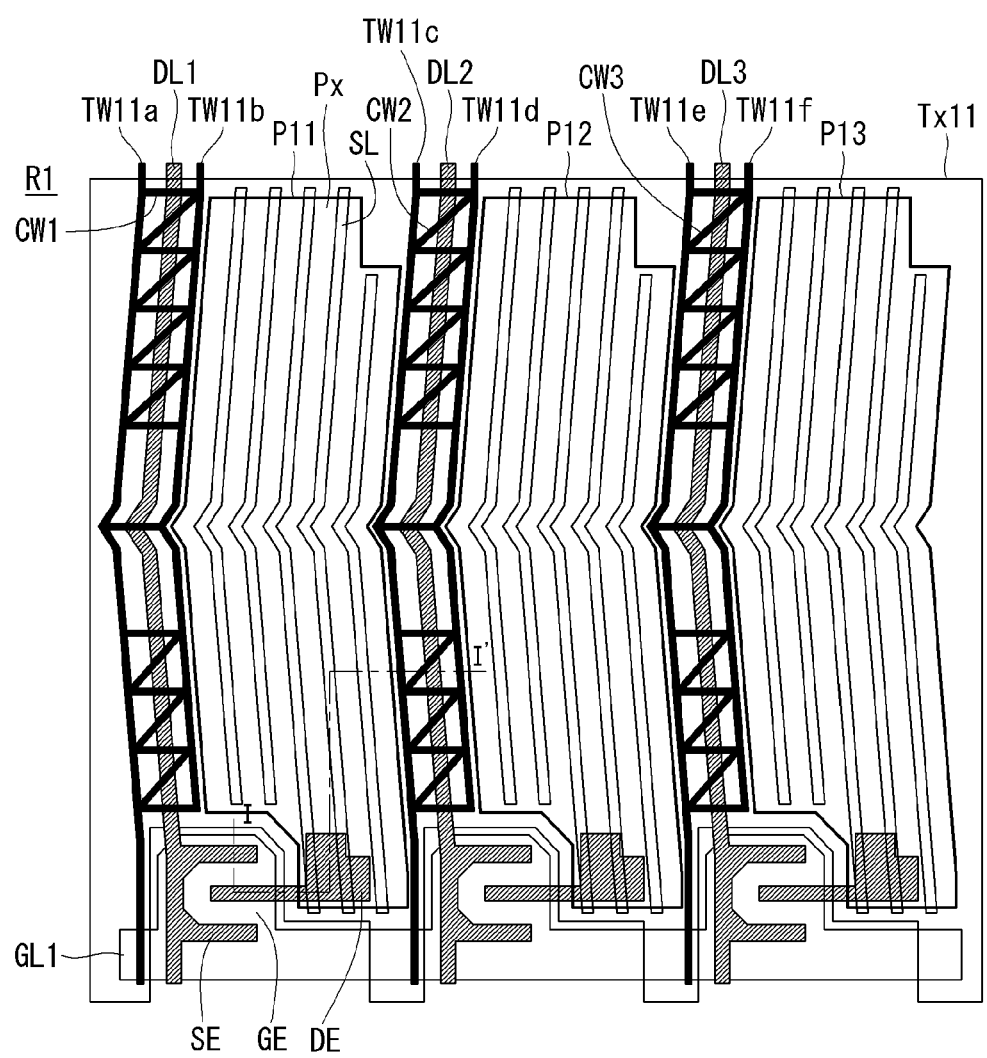
FIG. 10 is a plane view of a touch sensor integrated type display device according to another exemplary embodiment of the invention.

Hereinafter, a touch sensor integrated type display device according to another exemplary embodiment of the invention is described with reference to FIG. 10. FIG. 10 is a plane view of a touch sensor integrated type display device according to another exemplary embodiment of the invention.

The embodiment of the invention described in FIG. 10 is substantially the same as the embodiment of the invention described in FIG. 8, except that a connection line CW1 connecting a main routing wire TW11a and an auxiliary routing wires TW11b, a connection line CW2 connecting a pair of auxiliary routing wires TW11c and TW11d, and a connection line CW3 connecting a pair of auxiliary routing wires TW11e and TW11f are formed in the shape of a zigzag or a mesh. Thus, a further description may be omitted so as to avoid the duplication of the description. In the touch sensor integrated type display device shown in FIG. 10, because the connection lines CW1, CW2, and CW3 are formed in the shape of zigzag or mesh, a resistance of the touch sensor integrated type display device shown in FIG. 10 may be less than the resistance of the touch sensor integrated type display device shown in FIG. 8.

In the touch sensor integrated type display device according to the embodiments of the invention, because the main routing wire and the auxiliary routing wire are disposed on both sides of the data line or the pair of auxiliary routing wires are disposed on both sides of the data line, the main routing wire, the auxiliary routing wires, and the data lines form a vertical structure. Thus, a parasitic capacitance between the main routing wire and the auxiliary routing wires and the data lines in the touch sensor integrated type display device according to the embodiments of the invention may be markedly reduced as compared to a related art touch sensor integrated type display device forming a horizontal structure. Hence, the embodiments of the invention may reduce a ripple phenomenon generated in the common voltage and may prevent a reduction in the image quality.

Figure 11:
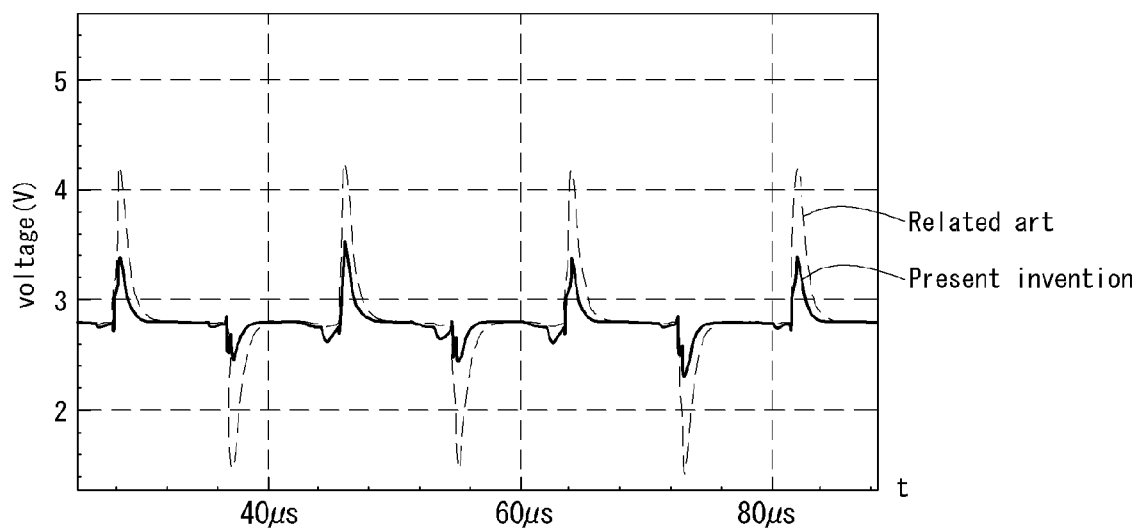
FIG. 11 is a graph showing a ripple phenomenon generated in a common voltage in a related art and an exemplary embodiment of the invention.

FIG. 11 is a graph showing a ripple phenomenon generated in a common voltage in the related art and the embodiment of the invention. As shown in FIG. 11, the ripple phenomenon in the touch sensor integrated type display device according to the embodiment of the invention was markedly reduced as compared to the related art.

Further, in the touch sensor integrated type display device according to the embodiments of the invention, the main routing wire and the auxiliary routing wire or the pair of auxiliary routing wires are disposed on both sides of the data line. In the related art touch sensor integrated type display device, touch routing wires are formed on a first passivation layer covering data lines. On the other hand, in the touch sensor integrated type display device according to the embodiments of the invention, because the main routing wire and the auxiliary routing wires are formed on the substantially same horizontal surface as the data line, a step coverage between a non-formation area of the data lines and the routing wires and a formation area of the data lines and the routing wires may be markedly reduced. Thus, the liquid crystals may be uniformly distributed, and a light leakage phenomenon may be prevented.

Although embodiments have been described with reference to a number of illustrative embodiments thereof, it should be understood that numerous other modifications and embodiments can be devised by those skilled in the art that will fall within the scope of the principles of this disclosure. For example, in the embodiments of the invention, the number of touch electrodes is merely an example for the explanation. Further, the embodiments of the invention describe that the main routing wire and the auxiliary routing wire are disposed on both sides of the data line. However, the routing wire may be disposed only on one side of the data line. Thus, various variations and modifications are possible in the component parts and/or arrangements of the subject combination arrangement within the scope of the disclosure, the drawings and the appended claims.

In the touch sensor integrated type display device according to the embodiments of the invention, because the main routing wire and the auxiliary routing wire are disposed on both sides of the data line or the pair of auxiliary routing wires are disposed on both sides of the data line, a parasitic capacitance between the main and auxiliary routing wires and the data lines may be markedly reduced as compared to a related art. Thus, the embodiments of the invention may reduce a ripple phenomenon generated in the common voltage and may prevent a reduction in the image quality.

Further, because the main routing wire and the auxiliary routing wires are formed on the substantially same horizontal surface as the data line, a step coverage between a non-formation area of the data lines and the routing wires and a formation area of the data lines and the routing wires may be markedly reduced. Thus, the liquid crystals may be uniformly distributed, and a light leakage phenomenon may be prevented.

It will be apparent to those skilled in the art that various modifications and variations can be made in the touch sensor integrated type display device of the present invention without departing from the spirit or scope of the invention. Thus, it is intended that the present invention cover the modifications and variations of this invention provided they come within the scope of the appended claims and their equivalents.

What is claimed is:

1. A touch sensor integrated type display device, comprising:
   a plurality of gate lines and a plurality of data lines, which are arranged to cross over each other;
   a plurality of pixel electrodes respectively disposed in areas defined by the crossing of the plurality of gate lines and the plurality of data lines;

a plurality of touch electrodes serving as common electrodes, each of which overlaps some of the plurality of pixel electrodes; and routing wires directly arranged on at least one side of each of first and second data lines related to the overlapped pixel electrodes corresponding to each touch electrode in parallel with the first and second data lines, wherein the routing wire is directly connected to the touch electrode serving as the common electrode, and wherein the routing wires include:

a main routing wire connected to any one of the plurality of touch electrodes serving as the common electrodes, and extended to outside of the any one touch electrode serving as the common electrode; and a plurality of auxiliary routing wires connected to any one of the any one touch electrode serving as the common electrode and the main routing wire, and arranged in parallel with the first and second data lines within an area of the any one touch electrode.

2. The touch sensor integrated type display device of claim 1, wherein the routing wire includes a respective portion parallel to and directly adjacent to each of the first and second data lines.

3. The touch sensor integrated type display device of claim 1, wherein the routing wire includes a main routing wire and an auxiliary wire branched from the main routing wire, the main routing wire being on the at least one side of the first data line by a distance substantially the same as a distance of the auxiliary wire from the second data line.

4. The touch sensor integrated type display device of claim 1, wherein the main routing wire is disposed on one said of the first date line, and wherein the plurality of auxiliary routing wires includes:

a first auxiliary routing wire disposed on another side of the fist data line, and a pair of second auxiliary routing wires respectively disposed on both sides of the second data line.

5. The touch sensor integrated type display device of claim 4, wherein the main routing wire is directly connected to the touch electrode serving as the common electrode, and wherein the first auxiliary routing wire and the pair of second auxiliary routing wires are directly connected to the main routing wire.

6. The touch sensor integrated type display device of claim 4, wherein the main routing wire is directly connected to the touch electrode serving as the common electrode, and wherein the first auxiliary routing wire and the pair of second auxiliary routing wires are directly connected to the touch electrode serving as the common electrode.

7. The touch sensor integrated type display device of claim 4, wherein the main routing wire is directly connected to the touch electrode serving as the common electrode, and wherein at least one of the first auxiliary routing wire and the pair of second auxiliary routing wires is directly connected to the touch electrode serving as the common electrode, and the remaining routing wire is directly connected to the main routing wire.

8. The touch sensor integrated type display device of claim 4, wherein the first auxiliary routing wire and the pair of second auxiliary routing wires are directly connected to the touch electrode serving as the common electrode, and the main routing wire is connected to at least one of the first auxiliary routing wire and the pair of second auxiliary routing wires.

9. The touch sensor integrated type display device of claim 4, wherein the main routing wire and the first auxiliary routing wire are directly connected to each other using at least one connection line, and wherein the pair of second auxiliary routing wires are directly connected to each other using at least one another connection line.

10. The touch sensor integrated type display device of claim 4, further comprising a first passivation layer and a second passivation layer, wherein the main, the first, and the second auxiliary routing wires are disposed on a first passivation layer covering the data lines, and wherein the touch electrode serving as the common electrode is disposed on a second passivation layer covering the routing wires.

11. The touch sensor integrated type display device of claim 4, wherein each of the main routing wire, the first auxiliary routing wire, and the pair of the second auxiliary routing wires is disposed in an area corresponding to a same touch electrode.

12. The touch sensor integrated type display device of claim 4, wherein the first and second data lines are adjacent data lines.

13. The touch sensor integrated type display device of claim 4, further comprising a plurality of thin film transistors disposed at crossings of the plurality of gate lines and the plurality of data lines, wherein the pixel electrode is disposed on a gate insulating layer covering the gate lines formed on a first substrate and is connected to a drain electrode of the thin film transistor, wherein the main, the first, and the second auxiliary routing wires are disposed on a first passivation layer covering the data lines and the thin film transistors, and wherein the touch electrode serving as the common electrode is disposed on a second passivation layer covering the routing wires.

14. The touch sensor integrated type display device of claim 13, wherein the main routing wire is connected to the touch electrode serving as the common electrode through a contact hole of the second passivation layer, and wherein the first and second auxiliary routing wires are directly connected to the main routing wire.

15. The touch sensor integrated type display device of claim 13, further comprising a second substrate positioned opposite the first substrate, a black matrix, and color filters divided by the black matrix being disposed on the second substrate, wherein the main, the first, and the second auxiliary routing wires are disposed in an area of the black matrix.

* * * * *